United States Patent [19]
Teller et al.

[11] 3,912,718
[45] Oct. 14, 1975

[54] BICYCLIC ACYL PENICILLINS

[75] Inventors: Daniel M. Teller, Devon; John H. Sellstedt, King of Prussia, both of Pa.

[73] Assignee: American Home Products Corporation, New York, N.Y.

[22] Filed: Mar. 22, 1973

[21] Appl. No.: 343,765

[52] U.S. Cl............ 260/239.1; 260/243 C; 424/271; 424/246
[51] Int. Cl.²................ C07D 499/46; C07D 499/44
[58] Field of Search.................................. 260/239.1

[56] References Cited
UNITED STATES PATENTS

| | | | |
|---|---|---|---|
| 3,041,332 | 6/1962 | Chow et al. | 260/239.1 |
| 3,518,253 | 6/1970 | Fosker et al. | 260/239.1 |

*Primary Examiner*—Nicholas S. Rizzo
*Attorney, Agent, or Firm*—Robert Wiser

[57] ABSTRACT

New bicyclic acyl penicillins and cephalosporins are disclosed. These new compounds display activity against gram-negative and gram-positive bacteria.

6 Claims, No Drawings

3,912,718

BICYCLIC ACYL PENICILLINS

BACKGROUND OF THE INVENTION

This invention relates to new compositions of matter known in the art of medicinal organic chemistry as penicillins and cephalosporins. Compounds of these types are well known for their pharmaceutical efficacy as antibacterial agents, and many of such compounds are currently being marketed for this purpose. Among the known penicillins and cephalosporins are Penicillin G, Penicillin V, Nafcillin, Cephalothin, etc. The penicillins and cephalosporins of the present invention differ from the prior art compounds in the 6 and 7 carboxamido substituents of the penicillins and cephalosporins respectively, wherein, the acyl portion of the carboxamido substituents is derived from either a bicycloalkyl or a bicycloalkenyl carboxylic acid.

SUMMARY OF THE INVENTION

The invention sought to be patented in its principal composition aspect resides in the concept of a chemical compound having the structure

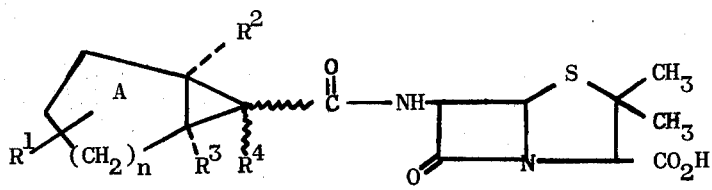

I or

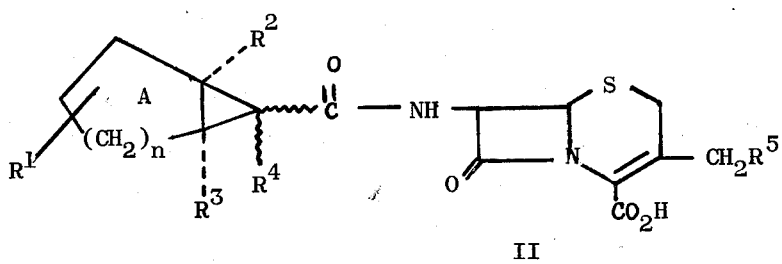

II wherein $R^1$, $R^2$, $R^3$, and $R^4$ may be the same or different and are hydrogen or alkyl of from 1 to 6 carbon atoms, $R^5$ is hydrogen, acetoxy

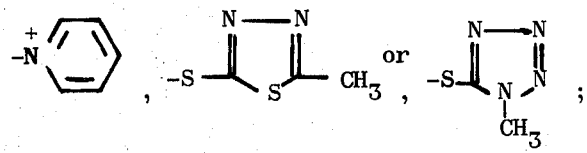

$n$ is an integer of from 1 to 4; and the ring labelled "A" may contain one double bond.

The tangible embodiments of the principal composition aspect of the invention possess the inherent general physical properties of being pale yellow to white crystalline solids, are substantially insoluble in water, and are generally soluble in such organic solvents as methanol, chloroform, tetrahydrofuran, and ethyl acetate. Examination of the compounds, produced as hereinafter described, reveals upon infrared, and proton magnetic resonance spectrographic analysis, spectral data supporting the molecular structure hereinbefore set forth. The aforementioned physical characteristics, taken together with the nature of the starting materials and the elemental analysis of the products obtained therefrom, further confirm the molecular structures set forth.

The tangible embodiments of the composition aspect of the invention possess the applied use characteristic of displaying gram-negative and gram-positive antibacterial activity as evidenced by testing in standard and accepted biological procedures.

The invention sought to be patented in a sub-generic composition aspect of the invention resides in the concept of a compound of structure I or II wherein R is hydrogen and $n$ is equal to 1.

DESCRIPTION OF THE INVENTION

In describing the preparation of the novel compounds of the instant invention, reference will be made to specific embodiments of the invention for reasons of convenience. The use of specific embodiments to illustrate the invention is merely descriptive, and is not intended to delimit the scope of the invention.

The novel compounds of the instant invention are prepared by condensing the appropriate bicyclic carboxylic acid or a suitable derivative of said acid (e.g. acid chloride) with 6-aminopenicillanic acid (6-APA) or 7-aminocephalosporanic acid (7-ACA). Several procedures for this condensation are available and are well-known to those skilled in the art of medicinal organic chemistry (see for example: R. G. Micetich, R. Raap, J. Howard, and I. Pushkas, J. Med. Chem., 15, 333 [1972]; J. L. Spencer, E. H. Flynn, R. W. Roeshe, F. Y. Siw, and R. R. Chauvette, J. Med. Chem., 9, 746 [1966]; and U.S. Pat. No. 3,654,266).

The bicyclic carboxylic acid starting materials for the novel compounds of the instant invention are either known in the organic chemical literature or are preparable by procedures known to those skilled in the art. Thus, for example, bicyclo [3.1.0]hex-2-ene-6-endo-carboxylic acid, bicyclo [3.1.0]-hexane-6-exo-carboxylic acid and bicyclo [3.1.0]hexane-6-endo-carboxylic acid may be prepared by the procedure of J. Meinwald, S. S. Labana, and M. S. Chadha, J. Am. Chem. Soc., 85, 582 (1963). It will be obvious to those skilled in the art of organic chemistry that the carboxylic acid function of these bicyclic acids may exist in either of two stereochemical configurations. Thus, both the endo and exo isomers are contemplated by the instant invention and are full equivalents for the purposes of the invention. The wavy lines (∼∼∼) in structures I and II are meant to indicate both of these possible isomeric configurations. In the preparation of the compounds of the invention, the bicyclic acid may be condensed directly with 6-APA or 7-ACA by using condensing agents well-known to those skilled in the art. Examples of common condensing agents are carbonyl diimidazole, dicyclohexyl carbodiimide, and isobutylchloroformate. The various solvents, times, and physical conditions which may be employed in these condensations are well-known in the art of organic chemistry. Similarly, the thusprepared penicillins and cephalosporins may be recovered by techniques well-known in this art, such as extraction from an aqueous solution. Alternatively, an acid halide of the bicyclo carboxylic acid starting material can be prepared by well-known procedures and condensed with, for example, an aqueous solution of a tertiary amine or alkali metal salt of 6-APA or 7-ACA; additionally, the bicyclic acid halide may be condensed with, for example, a silenated (see for example, U.S. Pat. No. 3,654,266); silane (see for example, U.S. Pat. No. 3,249,622); phosphorous (see for example, U.S. Patent application Ser. No. 217,942, filed Jan. 14, 1972); or saccharin (see for example, U.S. Pat. No. 3,635,953) derivative of 6-APA or 7ACA.

In a preferred embodiment of the instant invention, trimethyl-silylated 7-ACA is prepared in methylene chloride solution by adding trimethylchlorosilane to a suspension of 7-ACA in methylene chloride at room temperature under a nitrogen atmosphere, and N,N-diisopropylethylamine in methylene chloride is subsequently added at from 0°-5° C. This mixture is stirred at 0°-5° C. for 30 minutes and N,N-dimethylaniline is added. To this solution is added bicyclo[3.1.0]hex-2-ene-6-endo carboxylic acid chloride in methylene chloride solution and the total mixture is slowly allowed to come to room temperature before being poured into ice water. The pH of the resulting mixture is raised to ca. 8.5 and washed with, for example, ethyl acetate. The pH is finally adjusted to ca. 2.2 and the product extracted with, for example, ethyl acetate.

The anti-bacterial activity of the compounds of the present invention may be demonstrated by various standard bacteriological procedures, such as the Agar Serial Dilution Method. In this method, a stock concentration of the test compound is prepared in sterile buffer and two fold dilutions are made with sterile buffer. One ml. quantities of each dilution are incorporated in 9 ml. Seed agar in sterile Petri plates. The hardened surface is inoculated with test organisms using a Steers replicating device. The plates are incubated for 18 hours at 35° C.

The least amount of material which completely inhibits the test organism; minimal inhibitory concentration (MIC) is expressed in μg per ml.

| Test Compound | Test Organism | MIC(μg/ml) |
|---|---|---|
| 6-(Bicyclo[3.1.0]hex-2-ene-6-endo-carboxamido)penicillanic acid | Staphylococcus aureus 6538P | 3.90 |
| | Staphlylococcus aureus Smith | 3.90 |
| | Bacillus subtilis, 6633 | 7.81 |
| 7-(Bicyclo[3.1.0]hex-2-ene-6-endo-carboxamido)cephalosporanic acid | Bacillus subtilis, 6633 | 0.122 |
| | Echerichia col., 9637 | 15.6 |
| | Klebsiella pneumoniae, 10031 | 7.81 |
| | Proteus vulgaris, 6896 | 15.6 |
| | Salmonella paratyphi, 11737 | 7.81 |
| | Staphylococcus aureus, 6538P | 0.488 |
| | Staphylococcus aureus, Smith | 0.488 |
| | Staphylococcus aureus, CHP | 1.95 |
| | Staphylococcus aureus, 3-180 | 0.976 |

The following examples illustrate the best mode contemplated by the inventors for preparing the compositions of the invention.

EXAMPLE 1

7-(Bicyclo[3.1.0]Hex-2-Ene-6-Endo-Carboxamido) Cephalosporanic Acid a. To a solution of bicyclo [3.1.0]hex-2-ene-6-endo-carboxylic acid (0.020 moles, 2.48 g.) in methylene chloride (50 ml.) is added phosphorous pentachloride (0.020) moles, 4.17 g.) all at once at room temperature. The mixture is heated at reflux for one hour and stripped in vacuo. Toluene (50 ml.) is added to the residue and the mixture again stripped in vacuo. The residue is dissolved in methylene chloride (50 ml.) and used in (b).

b. To a suspension of finely-ground 7-ACA (0.022 moles, 6.00 g.) in methylene chloride (100 ml.) under nitrogen is added at room temperature all at once trimethylchlorosilane (0.044 moles, 5.60 ml.), followed at 0°-5° by a solution of N,N-diisopropylethylamine (7.55 ml.) in methylene chloride (50 ml.) over 30 minutes. After another 30 minutes at 0°-5° is added N,N-dimethylaniline (5.10 ml.) all at once. Then the solution from (a) above is added at 0°-5° over 30 minutes. The mixture is allowed to come to room temperature over ca 30 minutes and poured into ice water (200 ml.). The pH of the mixture is raised to 8.5 with 5N sodium hydroxide, the aqueous layer separated and washed twice with ethyl acetate. Ethyl acetate (200 ml.) is added to the aqueous layer and the pH of the mixture lowered to 2.2 with concentrated hydrochloric acid. The organic layer is separated, washed with water, brine and dried over anhydrous sodium sulfate. Evaporation in vacuo <40° gives a yellow solid residue. Recrystallization by dissolving in a small amount of methylene chloride, adding benzene, carefully evaporating in vacuo at room temperature to the cloud point and cooling to 0° gives 2.80 g. of 7-(bicyclo[3.1.0]hex-2-ene-6-endo-carboxamido)cephalosporanic acid; m.p. 156°–158° (d); $\lambda^{KBr}_{max}$ 5.64, 5.81, 6.21, 6.60 μ; $\lambda^{EtOH}_{max}$ 262 mμ (ε 7,580); NMR has 2.08, 2.68, 3.48, 4.67, 5.00 and 5.74 ppm peaks.

Analysis for: $C_{17}H_{18}N_2O_6S$
Calculated: C, 53.95; H, 4.80; N, 7.40; S, 8.47
Found: C, 53.66; H, 4.88; N, 7.09; S, 8.61.

EXAMPLE 2

6-(Bicyclo[3.1.0]Hex-2-Ene-6-Endo-Carboxamido) Penicillanic Acid

To a solution of bicyclo[3.1.0]hex-2-ene-6-endo-carboxylic acid (0.72 g., 0.005 moles) in dry tetrahydrofuran (20 ml.) containing triethylamine (0.70 ml.) at −10° C. under nitrogen is added all at once isobutyl chloroformate (0.65 ml., 0.01 moles). The mixture is stirred at −10° for 10 minutes and a solution of 6-APA (1.08 g., 0.005 moles) and triethylamine (0.70 ml.) in water/tetrahydrofuran (1:1, 20 ml.) is added all at once. The mixture is stirred at 5° for 1 hour and 25° for 1 hour. The tetrahydrofuran is evaporated in vacuo <40° and a solution of 60 ml. of water and 20 ml. of ethyl acetate is added. The mixture is shaken thoroughly and the organic layer is discarded. The aqueous layer is cooled to 5°, 60 ml. of ethyl acetate is added and the mixture acidified to pH =2.9 with 10% aqueous hydrochloric acid. The organic layer is separated and the aqueous layer is extracted with 40 ml. of ethyl acetate. The combined extract and organic layer are washed with water, brine and dried over anhydrous sodium sulfate. Evaporation in vacuo (<40°) yields 6-(bicyclo [3.1.0]hex-2-ene-6-endo-carboxamido)-penicillanic acid m.p. 90°–110° C.; $^{oKBr}_{max}$ 5.85, 6.05 μ; NMR has peaks at 1.63 and 1.72 ppm.

EXAMPLE 3

7-(Bicyclo[3.1.0]Hexane-6-Endo-Carboxamido) Cephalosporanic Acid a. To a solution of bicyclo[3.1.0]hexane-6-endo-carboxylic acid (1.26 g., 0.01 moles) in methylene chloride (25 ml.) at room temperature is added phosphorous pentachloride (2.09 g., 0.01 moles) all at once. The mixture is heated at reflux for one hour, and evaporated in vacuo. Toluene is added and heated at reflux for 1 hour, and evaporated in vacuo. Toluene is added and the mixture again evaporated in vacuo. Toluene is added once more and the mixture again evaporated in vacuo. Methylene chloride (25 ml.) is added and the solution used in (b) below.

b. To a suspension of 7-ACA (3.0 g., 0.011 moles) in methylene chloride (50 ml.) under nitrogen at room temperature is added chlorotrimethylsilane (2.80 ml., 0.022 moles) all at once at room temperature. The mixture is cooled to 5° and a solution of N,N-diisopropylethylamine (3.78 ml.) in methylene chloride (50 ml.) is added over 30 minutes at 5°. N,N-Dimethylaniline (2.55 ml.) is added all at once then the acid chloride in methylene chloride from (a) above is added at 5° over 30 minutes. The mixture is then allowed to come to room temperature (ca. 30 minutes) and poured into cold water (200 ml.). The pH of the mixture is then raised to 8.5 with 5N sodium hydroxide. The squeous layer is separated and washed twice with ethyl acetate (200 ml.). Ethyl acetate (200 ml.) is added to the aqueous fraction and the mixture is acidified to pH = 2.2 with concentrated hydrochloric acid. The organic layer is separated, washed twice with brine, dried over anhydrous sodium sulfate and stripped in vacuo. The solid residue is recrystallized from methylene chloride/hexane at room temperature to give 7-(bicyclo[3.1.0]hexane-6-endo-carboxamido) cephalosporanic acid; m.p. 141°–143°; $\lambda^{KBr}_{max}$ 5.62, 5.80, 6.19; NMR has 1.67 and 2.10 ppm peaks.

Analysis for: $C_{17}H_{20}N_2O_6S$ . 2/3 hexane (MW = 437.81)
Calculated: C, 57.63; H, 6.75; N, 6.40; S, 7.32
Found: C, 58.09; H, 5.33; N, 6.03; S, 7.32.

The subject matter which the applicants regard as their invention is particularly pointed out and distinctly claimed as follows:

1. A compound having the structure:

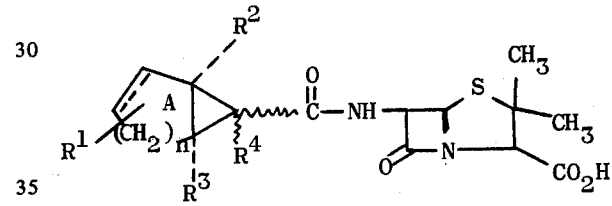

wherein $R^1$, $R^2$, $R^3$, and $R^4$ may be the same or different and are hydrogen or alkyl of from 1 to 6 carbon atoms; $n$ is an integer of from 1 to 4; and the dashed line in Ring A indicates an optional double bond when $n$ is 1.

2. The compound of claim 1, 6-(bicyclo[3.1.0]hex-2-ene-6-carboxamido)penicillanic acid.

3. The compound of claim 1, 6-(bicyclo[3.1.0]hexane-6-carboxamido)penicillanic acid.

4. The compound of claim 1, 6-(bicyclo[3.1.0]hex-2-ene-6-endo-carboxamido)penicillanic acid.

5. The compound of claim 1, 6-(bicyclo[3.1.0]hexane-6-endo-carboxamido)penicillanic acid.

6. Compounds of claim 1 wherein $R^1$, $R^2$, $R^3$, and $R^4$ are hydrogen, and $n=1$.

* * * * *